United States Patent [19]

Wild et al.

[11] Patent Number: 5,300,580

[45] Date of Patent: Apr. 5, 1994

[54] MODIFIED ETHYLENE/N-BUTYL ACRYLATE COPOLYMERS HAVING IMPROVED ADHESION

[75] Inventors: Leslie Wild, Wyoming; Karl Koch, deceased, late of Cincinnati, both of Ohio, by Audrey M. Koch, administratrix

[73] Assignee: Quantum Chemical Corporation, Cincinnati, Ohio

[21] Appl. No.: 703,972

[22] Filed: May 22, 1991

[51] Int. Cl.$^5$ .............................................. C08F 265/04
[52] U.S. Cl. ......................................... 525/301; 525/303; 525/308; 525/309
[58] Field of Search ................ 525/301, 303, 308, 309

[56] References Cited

U.S. PATENT DOCUMENTS

| | | | |
|---|---|---|---|
| 2,200,429 | 5/1940 | Perrin et al. | 526/235 |
| 2,599,119 | 6/1952 | McQueen | 524/96 |
| 2,599,123 | 6/1952 | Pinkney et al. | 525/119 |
| 3,480,580 | 11/1969 | Joyner et al. | 525/263 |
| 3,481,910 | 12/1969 | Brunson et al. | 525/285 |
| 3,773,699 | 11/1973 | Bergmeister et al. | 525/309 |
| 4,013,805 | 3/1977 | Corey et al. | 427/389.9 |
| 4,116,913 | 9/1978 | Barabas | 524/96 |
| 4,157,362 | 6/1979 | Morishita et al. | 525/301 |
| 4,347,341 | 8/1982 | Bartl et al. | 525/267 |
| 4,376,855 | 3/1983 | Ames | 528/271 |
| 4,434,266 | 2/1984 | Trivette, Jr. | 525/301 |
| 4,599,378 | 7/1986 | Hausman et al. | 524/554 |
| 4,690,981 | 9/1987 | Statz | 525/221 |
| 4,801,649 | 1/1989 | Statz | 525/183 |

FOREIGN PATENT DOCUMENTS 1118141 2/1982 Canada.
963380 7/1964 United Kingdom.

OTHER PUBLICATIONS

Wielinski, D. C., *Adhesives Age* (Nov. 1989), pp. 30-33.

*Primary Examiner*—John Kight, III
*Assistant Examiner*—Rabon Sergent
*Attorney, Agent, or Firm*—Kenneth D. Tremain; Gerald A. Baracka

[57] ABSTRACT

Modified ethylene/n-butyl acrylate copolymers obtained by grafting a half-ester of maleic acid onto a randomly copolymerized ethylene/n-butyl acrylate backbone are provided. The carboxylic functionalized polymers of the invention exhibit superior adhesion to non-polar substrates. They are particularly effective for adhering metals.

7 Claims, No Drawings

MODIFIED ETHYLENE/N-BUTYL ACRYLATE COPOLYMERS HAVING IMPROVED ADHESION

BACKGROUND OF THE INVENTION

1. Field of the Invention

This invention relates to modified ethylene/n-butyl acrylate (EnBA) copolymers having improved adhesion to non-polar substrates. Significantly improved metal adhesion is obtained by grafting a half-ester of maleic acid, e.g., monopropyl maleate, to EnBA copolymers.

2. Description of the Prior Art

The ability of ethylene to be polymerized with a variety of monomers, such as vinyl esters, is well known. For example, vinyl acetate (VA) is polymerized with ethylene to produce ethylene/vinyl acetate (EVA) resins which are widely used in hot-melt and other adhesive systems. It is also known that ethylene can be copolymerized with n-butyl acrylate (nBA) to produce EnBA copolymers. While EnBA and EVA resins containing comparable molar amounts of the comonomer exhibit minor differences in polarity, density, tensile, elongation, softening point, heat stability, low temperature flexibility, etc., the resins are sufficiently similar so that they can be used in many of the same Comparisons of EVA and EnBA resins of the type used in hot melt adhesive systems are discussed in an article by D. C. Wielinski, *Adhesives Age*, November 1989, pp. 30-33.

Even though EVA and EnBA resins are useful for the formulation of hot melt adhesive and sealant systems, adhesion to metals, such as aluminum, is generally considered to be quite low. We have now found that significant improvement of metal adhesion can be achieved by crafting a half-ester of maleic acid, such as monopropyl maleate, to EnBA copolymers. While it is generally known that adhesion to metals and other non-polar substrates can be enhanced by incorporating adhesion promoting carboxylic monomers, the improvement obtained with the present invention is unexpected compared to the results obtained with comparable grafted EVA copolymers.

Numerous adhesion promoting monomers, primarily acrylic acid and maleic acid (or derivatives thereof), have been incorporated into ethylene copolymers either by direct polymerization or grafting. Ethylene/vinyl acetate/methacrylic acid terpolymers, for example, are known and commercially available from E. I. duPont le Nemours and Company under the trademark Elvax. Ethylene/monomethyl maleate/alkyl acrylate polymers are disclosed in U.S. Pat. Nos. 2,599,119 and 2,599,123. Ethylene and monomethyl maleate are copolymerized in British Pat. 963,380 and copolymers of ethylene and monobutyl maleate are disclosed in Canadian Pat. 1,118,141. Polymers of monoalkyl esters of maleic acid and vinyl acetate, with and without other comonomers, are disclosed in U.S. Pat. Nos. 4,013,805, 4,116,913, 4,347,341, and 4,599,378.

Numerous references are also known which disclose grafting of unsaturated polycarboxylic compounds and their partial or complete esters to a variety of polymer substrates. Generally, grafting is accomplished using peroxide but some processes use other radical-generating means. For example, polypropylene and propylene-/α-olefin copolymers are thermally degraded and grafted in U.S. Pat. Nos. 3,480,580 and 3,481,910. Mono- and diesters of maleic acid are disclosed as suitable grafting monomers in both references. Maleic semi-esters and semiamides are disclosed for grafting a variety of polymer substrates, including polyethylene and EVA, in U.S. Pat. No. 4,347,341.

SUMMARY OF INVENTION

The present invention relates to modified EnBA copolymers which exhibit improved adhesion to non-polar substrates. The modified copolymers are carboxylic functionalized polymers having a melt flow rate greater than 0.5 comprised of a randomly copolymerized ethylene/n-butyl acrylate backbone having grafted thereto an amount of a lower alkyl monoester of maleic acid such that the functionalized polymer has an acid number greater than 3. Typically, the copolymer will containing from 15 to 45 weight percent in nBA and be grafted with a mono-$C_{1-4}$ alkyl maleate to an acid number of 4 to 15. There is also provided a method for improving the metal adhesion of ethylene/n-butyl acrylate copolymers which comprises grafting an amount of a lower alkyl monoester of maleic acid onto an ethylene/n-butyl acrylate copolymer having a melt index greater than 2 and containing from 15 to 45 percent n-butyl acrylate to increase the acid number to a value greater than 0.5.

DETAILED DESCRIPTION

Modified EnBA copolymers exhibiting improved adhesion to non-polar substrates, particularly metal surfaces, are obtained by the present invention. The improvement is obtained by grafting a half-ester of maleic acid onto an EnBA copolymer backbone to produce what is referred to herein as the modified EnBA copolymer.

EnBA copolymers which can be utilized to obtain the improved modified products of the invention are any of those products conventionally prepared by copolymerizing ethylene and n-butyl acrylate. Such copolymerizations are well known in the prior art and generally are carried out at pressures up to about 15,000 psi and temperatures from 150° C. to 250° C. in the presence of a suitable catalyst. The copolymerization of ethylene and lower alkyl acrylates is, for example, described in U.S. Pat. No. 2,200,429.

The EnBA copolymer resins will typically contain 15 to 45 weight percent nBA. In a particularly useful embodiment the EnBA copolymers will have from about 20 to 40 weight percent nBA copolymerized. The melt index of these copolymers can range from fractional values up to about 400 or above. Most usually, the melt index of the EnBA will be from about 0.5 up to about 125, and more preferably, from 0.5 up to about 50 for the intended applications. All melt indexes referred to herein are determined at 190° C. in accordance with ASTM D1238, condition E, and are expressed in grams per 10 minutes. Typically, the EnBA copolymer prior to modification with the maleic half-ester will not have an acid number or the acid number will be negligible. Useful EnBA copolymers of the above types are commercially available from Quantum Chemical Corporation USI Division and sold under the trademark ENATHENE. Specifications of four ENATHENE products which can be used are as follows:

| ENATHENE | EA 80807 | EA 80808 | EA 89821 | EA 89822 |
|---|---|---|---|---|
| Wt. % nBA | 28 | 35 | 35 | 35 |
| Melt Index | 40 | 40 | 110 | 400 |

-continued

| ENATHENE | EA 80807 | EA 80808 | EA 89821 | EA 89822 |
|---|---|---|---|---|
| % Elongation | 700 | 620 | 440 | 220 |
| Tensile Strength (psi) | 500 | 310 | 240 | 200 |
| Density (g/cm³) | 0.9241 | 0.9255 | 0.9248 | 0.923 |
| Shore A Hardness | 80 | 70 | 62 | 59 |
| R&B Softening point (°F.) | 225 | 230 | 187 | 178 |

The maleic half-esters used to modify the EnBA copolymer have the general formula

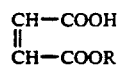

where R is an alkyl radical having from 1 up to about 12 carbon atoms. Most preferably, the alkyl substituent R will have from 1 to 8 carbon atoms. Highly desirable results are obtained when the alkyl moiety has from 1 to 4 carbon atoms and monopropyl maleate has been found to be particularly advantageous. The half-esters are obtained using conventional esterification procedures by reacting one equivalent of maleic anhydride or maleic acid with one equivalent of an aliphatic alcohol. As will be understood by those skilled in the art, while products of such reactions are referred to as half-esters they may, in addition, contain minor amounts of fully esterified species and species which have no ester groups.

The maleic half-ester is grafted to the EnBA polymer backbone using established procedures known to the art. The grafting can be accomplished in solution but most commonly is carried out in the polymer melt. While free radical initiating sources are typically utilized to facilitate the grafting, the half-ester may be grafted using thermal or photochemical initiation. In a particularly preferred embodiment, a small amount of organic peroxide having a suitable decomposition temperature is added to the resin melt in a mixer, such as a Brabender or extruder, and maintained for a period of time sufficient to decompose the peroxide and effect grafting If the organic peroxide is a solid it may be dissolved in a small amount of solvent to facilitate introduction into the polymer melt.

The amount of maleic half-ester grafted onto the EnBA copolymer backbone will be sufficient to achieve the desired acid number for the modified, i.e. grafted copolymer. The acid number of the modified EnBA copolymer should be greater than 3 in order to achieve acceptable adhesion values. Acid numbers in the range of 4 to 15 and, more preferably, 5 to 12 have been found to provide particularly useful results The amount of maleic half-ester used in the grafting operation can vary widely depending on the particular procedure used. However, since the presence of maleic half-ester, unreacted graft monomer has a detrimental affect on adhesion, it is preferred to use the lowest level of graft monomer possible and to employ the most effective grafting method. This minimizes the amount of residual monomer present with the modified EnBA copolymer and the problems associated therewith. In some instances, it may be advantageous or even necessary to remove unreacted residual maleic half-ester monomer from the product prior to use.

EXAMPLES

The following examples demonstrate the improved adhesion realized with the modified EnBA copolymers of this invention obtained by grafting maleic half-esters onto an EnBA copolymer. In these examples all percentages are on a weight basis. Melt indexes are determined at 190° C. in accordance with ASTM D1238, condition E, and acid numbers are determined using the titration procedure described in U.S. Pat. No. 4,376,855. Reported adhesion values were determined using laminated aluminum panels in the T-peel test in accordance with ASTM D1876-72. This test provides a measure of the peel resistance of adhesives to various flexible substrates, i.e., substrates which can be put through any angle up to 90° C. without breaking or cracking.

Modified copolymer products used in the examples were prepared by grafting monopropyl maleate onto the EnBA copolymer. Grafting was carried out by mixing all of the ingredients in a Brabender mixer at 165° C. for 15-20 minutes. 3.2 Percent monopropyl maleate and 0.5 percent dicumyl peroxide were used for all of the reactions. After the grafting operation, unreacted monopropyl maleate was removed by dissolving the modified product in xylene and precipitating in acetone. The modified product was dried prior to adhesion testing and acid number determination.

EXAMPLE 1

To demonstrate the improved results obtained by the present invention a commercially available EnBA copolymer (ENATHENE 80807) containing 27.6 percent n-butyl acrylate and having a melt flow rate of 4.2 was grafted with monopropyl maleate in accordance with the above-described procedure. The unmodified EnBA copolymer had no measurable acid number. After grafting, the modified EnBA copolymer had an acid number of 9.3 and melt flow rate of 0.60. Whereas the commercial EnBA copolymer had an adhesion value of only 0.13 psi in the T-peel test, the modified EnBA copolymer grafted with the monopropyl maleate had an aluminum adhesion value of 8.5 psi.

EXAMPLE 2

To further demonstrate the superior adhesion obtained when EnBA copolymers are modified with maleic half-esters, a higher nBA content copolymer (ENATHENE 80809) was grafted with monopropyl maleate. The copolymer contained 38.8 percent nBA and had a melt index of 7.6 and no measurable acid number. After grafting with 3.2 percent monopropyl maleate, the modified EnBA copolymer had an acid number of 8.4 and melt flow rate of 1.35. The modified EnBA copolymer had a T-peel adhesion value of 21.6 psi compared to a value of only 0.99 psi for the unmodified EnBA copolymer control.

The superior adhesion observed with aluminum using the modified EnBA copolymers of Examples 1 and 2 is even more apparent when it is considered that a commercially available product, ELVAX 4355 (ethylene/vinyl acetate/acrylic acid terpolymer; acid number 6.5; melt index 5.2), widely promoted as an adhesive resin only had a T-peel adhesion value of 3.76 psi. Even though the commercial terpolymer adhesive resin has an acid number which is comparable to that of the modified EnBA copolymers and contains a comparable level of copolymerized comonomer, the aluminum adhesion value obtained with this product is significantly lower than achieved with the modified EnBA copolymers, particularly the higher nBA content copolymer of Example 2.

We claim:

1. A modified ethylene/n-butyl acrylate copolymer having a melt index greater than 0.5 and acid number from 4 to 15 consisting of a random ethylene/n-butyl acrylate copolymer backbone grafted with a $C_{1-8}$ alkyl monoester of maleic acid.

2. The modified copolymer of claim 1 wherein the random ethylene/n-butyl acrylate copolymer backbone contains 15 to 45 weight percent copolymerized n-butyl acrylate and the alkyl group of the monester of maleic acid contains from 1 to 4 carbon atoms.

3. The modified copolymer of claim 2 wherein the alkyl monester of maleic acid is monopropyl maleate.

4. The modified copolymer of claim 3 which has an acid number from 5 to 12 and wherein the random ethylene n-butyl acrylate copolymer backbone contains 20 to 40 percent n-butyl acrylate.

5. A method for improving the metal adhesion of ethylene/n-butyl acrylate copolymers which consists of modifying a random ethylene/n-butyl acrylate copolymer containing from 15 to 45 weight percent n-butyl acrylate and having a melt index greater than 0.5 by grafting with a $C_{1-8}$ alkyl monester of maleic acid to increase the acid number to 4 to 15.

6. The method of claim 5 wherein the random ethylene/n-butyl acrylate copolymer contains from 20 to 40 weight percent n-butyl acrylate and the alkyl group of the alkyl monoester of maleic acid contains from 1 to 4 carbon atoms.

7. The method of claim 6 wherein monopropyl maleate is grafted using an organic peroxide initiator and the acid number of the grafted ethylene/n-butyl acrylate copolymer is 5 to 12.

* * * * *